United States Patent Office 2,947,111
Patented Aug. 2, 1960

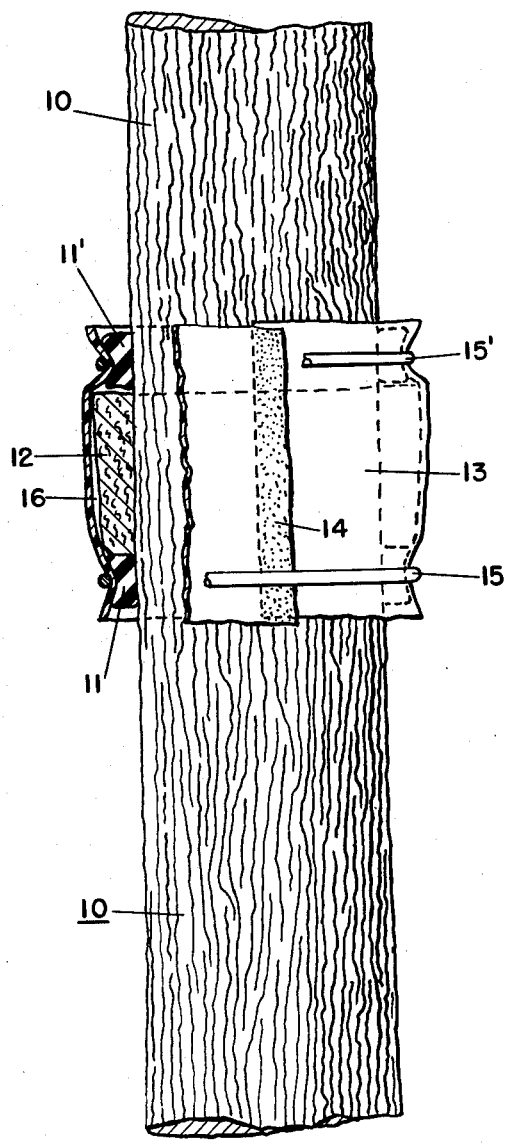

2,947,111

SYSTEMIC FUNGICIDAL SOLUTION AND METHOD OF APPLICATION

Leo Zobrist, Dielsdorf-Zurich, Switzerland, assignor to Dr. R. Maag, Limited, a corporation of Switzerland Filed Oct. 3, 1958, Ser. No. 765,055

6 Claims. (Cl. 47—58)

This invention concerns a systemic fungicidal solution, particularly for use in fungus diseases of trees.

A further object of the present invention is to provide a means for simply and effectively applying systemic fungicidal solutions to trees.

A preferred embodiment of this invention makes possible the control of the European chestnut blight caused by *Endothia parasitica* (Murr.) And. It also concerns application of said systemic fungicidal solution for the control of fungal growth on other trees, such as elm trees, for the control of Dutch elm disease, apple trees for the control of apple scab, etc.

The use of systemic fungicides in a variety of plants is well-known to those skilled in the art. This method of eradication of fungal diseases and/or protection against further infection is particularly applicable to trees, and there are several methods of application. With liquid systemic fungicides or emulsions or solutions of systemic fungicides, the spray application of these liquids to the growing tree will frequently permit enough absorption to give systemic protection. Solid fungicides may be used in the well-known manner for application by dusting, i.e., by compounding with various inert solid powders. Another method of application comprises supplying the systemic fungicide to the soil in such a manner that it can be absorbed along with other soil solutions by the feeder roots. Thus, with smaller plants, the systemic fungicide may be mixed into the soil at the time of planting. With larger trees, the systemic fungicide can be applied by driving holes in the soil near the feeder roots and filling said holes with the systemic fungicide. Still another method set forth in the prior art consists of drilling a transverse hole in the trunk of the tree into the sapwood and injecting a liquid preparation of the systemic fungicide into the hole for distribution throughout the tree by the sap stream.

While the application of the systemic fungicide to the growing tree with subsequent absorption into the sap stream or application to the soil for absorption by the feeder roots will frequently make possible the supply of a sufficient concentration of fungicide to give fungus control, both methods of application are inefficient because of high losses due to run-off from the plant or leaching out of the soil before the plant can absorb the fungicide. The method of application which comprises injection of the fungicide into boreholes in trees is laborious and is primarily applicable only to trees which are to be felled shortly after the injection of the systemic fungicide. Furthermore, if the holes are omitted, the solutions of systemic fungicides used heretofore may be substantially ineffective.

This invention concerns, first of all, systemic fungicidal solutions for controlling fungal diseases, particularly fungal diseases of trees, as well as a process for applying to said trees.

The process of the present invention for application of the systemic insecticide of the present invention comprises contacting a portion of the bark of the tree with a solution of the systemic fungicide which is maintained in contact with said portion of bark by means of an absorptive fibrous structure held in place by a vapor-tight plastic film as hereinafter set forth. If the bark of the trees to be treated is substantially smooth, as in the case with most young trees, then no pre-treatment is necessary. If the bark is rough or thick, then it is generally smoothed and the thickness decreased by abrasion with coarse sand paper or emery cloth in order to provide a tight seal. It is also possible, when the lower bark is rough and thick, to use an area higher on the trunk where the bark is smoother and thinner. However, since the movement of fluids within the parts of the trees is generally in an upward direction from the roots to the uppermost parts of the trees, the use of higher portions of the trees for the application of the systemic fungicidal solution is not preferred. The bark area chosen is wrapped with a length of absorbent fibrous wadding, the dimensions of said wadding depending on the size of the tree and the amount of fungicide to be applied to said tree. This band of wadding is then covered with a length of a water impervious film substantially wider than said wadding band, the length of said impervious film being sufficient to circle the tree with an overlap of approximately one inch. This overlap is butt joined and the butt joint sealed. At the lower edge of the water impervious film, a piece of water-repellent wadding is inserted and the bottom edge of the water impervious film is clamped around the tree trunk making a water-tight seal on the water-repellent wadding which was inserted there below. There is now a water impervious annular ring around the trunk, and the systemic fungicidal solution of this invention is poured into said annular ring. It is preferred to seal the top edge of the water impervious film in the same manner as was the bottom edge, namely by inserting a piece of water-repellent wadding under the top edge of the water impervious film, and clamping said film against said wadding so as to form a water-tight seal at the top of said water impervious film.

Other means for effecting a seal at the top edge of the water impervious film will be apparent to those skilled in the art. One embodiment of the present invention effects a seal between the tree trunk and the water impervious film by pouring into the area between the trunk and the film a molten wax or mastic which is water-insoluble and water-impermeable and a solid under ambient temperature conditions.

The nature of the wadding used is not critical as long as it possesses the desired absorbency. For economy and because of availability, a cellulosic absorbent wadding is the preferred embodiment.

The water impervious film must be stable under outdoor exposure and stabilized plasticized polyvinyl chloride and related copolymers can be suitably employed. Flexible polyolefin films or foils can also be employed, typical being polyethylene or polypropylene films.

The nature of the water-repellent wadding employed for the top and bottom seals is not critical and felt impregnated with resilient water-insoluble and water-repellent resinous compositions can be used. Foamed natural rubber, GR–S or neoprene, may also be employed as may be urethane foams or resilient polyvinyl chloride foams.

The means of clamping the top and bottom of the water impervious film can be varied appreciably without departing from the spirit of this invention. Thus, the top and bottom of the film may be tied with strips of vulcanized rubber. Alternatively, metal bands suitably fastened may be used as top and bottom clamps. Similarly, pressure sensitive vinyl polymer backed tape may be used to seal the top and bottom. It is preferred that the means of clamping the top and bottom of the water impervious film exhibits some elongation at ambient temperatures in order to be able to compensate for any growth of the tree trunk which may occur while this means of applying systemic fungicides is in place on the tree trunk.

It is to be understood that the materials chosen for use in this annular ring seal do not impart phytotoxic materials to the systemic fungicidal solution or chemically react with said solution.

In the drawing, 10 represents a section of the tree trunk to be treated. 11 is a strip of resilient sealing means, the nature of which is set forth above. 12 is the strip of fibrous absorbent wadding which is applied around the tree trunk to absorb the fungicidal solution. There is then applied the water impervious film 13, which is then joined or sealed together as shown at 14. There is then applied clamping means 15 to the bottom of the ring of water impervious film. This forms an annular ring around the tree trunk into which ring the fungicide, 16, is poured. Sealing means 11' is then placed around the trunk and clamping means 15' is placed around the top of the water impervious film 13 to form a vapor proof seal.

The systemic fungicidal solutions of the present invention comprise the equilibrium reaction products obtained by reacting in aqueous solution (a) one mole of at least one polyethylenepolyamine, (b) two moles of carbon disulfide, (c) two equivalents of an inorganic hydroxide, and (d) two moles of an acid salt of dimethyl- or diethylamine.

Suitable polyethylenepolyamines include ethylenediamine, diethylenetriamine, triethylenetetramine and tetraethylenepentamine. Mixtures of these polyamines and higher polyethylenepolyamine homologues result when ethylene dichloride is reacted with ammonia. It has been found that it is not necessary to separate this polyamine mixture but that the equivalent of one mole of the mixture can be employed as the polyamine in the preparation of the systemic fungicidal solutions of the present invention.

Suitable inorganic hydroxides include those of lithium, sodium, potassium, ammonium, calcium, and magnesium.

Suitable acid salts of dimethyl- and diethylamines include the amine salts of hydrochloric acid, hydrobromic acid, sulfuric acid, phosphoric acid, and nitric acid. Since the acidic portion of these amine salts is neutralized by the inorganic hydroxide, the nature of the acid portion, as long as it renders the amine portion water-soluble, is of lesser importance.

The order of addition of the four reactants is not important since it is the equilibrium reaction products formed by the interaction of the four reactants in aqueous solution which are employed as the systemic fungicidal solutions of the present invention. It appears possible to reach equilibrium from several directions. Thus, the polyethyleneamine may be reacted with carbon disulfide in the presence of the inorganic hydroxide and the acid salt of dimethylamine or diethylamine subsequently added. It is also possible to produce the products of the present invention by adding all four reactants simultaneously. The products of the present invention may also be prepared by dissolving preformed disodium ethylene bisdithiocarbamate in water and adding acid salts of dimethylamine or diethylamine to said aqueous solution.

Despite the fact that products with the desired fungicidal properties can be prepared in several different ways as set forth hereinbefore, it should be clearly understood that the desired equilibrium mixture is not merely a mechanical mixture of the individual reactants. Although the composition of the equilibrium mixture is not definitely known, it appears to be a complex of the various intermediates.

The systemic fungicidal solutions of the present invention are generally applied at a concentration range equivalent to 0.5 to 2.0 pounds of solids content per 100 gallons of water. A preferred concentration is the equivalent of 1.0 pound of solids per 100 gallons of water. The quantity of solution applied per tree will vary greatly depending on the size of the tree and the intensity of fungus infection, but with 3 to 5-year old chestnut trees as set forth hereinafter, the application of 500 ml. of a solution of the above concentration will provide effective control for one year.

The following examples set forth certain well-defined instances of the application of this invention. They are not, however, to be considered as limitations thereof, since many modifications may be made without departing from the spirit and scope of this invention.

Unless otherwise specified, all parts are parts by weight.

EXAMPLE I

A. Preparation of the equilibrium mixture

To 22.8 parts of the disodium ethylene bisdithiocarbamate in 200 parts of water were added 14.2 parts of the sulfuric acid salt of dimethylamine (i.e. dimethylammonium sulfate). Stirring was continued at room temperature until the solution was homogeneous. Prior to use this solution was diluted to a concentration of one pound per 100 gallons.

B. Application to trees

It is preferred to treat the chestnut trees when they are from 3 to 5-years old. No pre-treatment of the bark is required. A piece of cotton wadding 100 cm. long and 10 cm. wide is wrapped around the trunk of the tree about 50 to 100 cm. above the ground. The wadding is covered with a piece of polyethylene foil 50 microns thick, 35 cm. wide, and 60 cm. long. The length will vary, depending on the diameter of the tree. The ends of the foil are placed in contact with each other and sealed at the vertical joint. A thin section of rubber foam is inserted under the lower edge of the polyethylene foil and the lower edge then clamped to seal the foil to the tree through the compression of the foam. This forms an annular ring around the tree, the bottom edge of said ring being sealed to the tree and liquid-proof. Into this ring was poured about 500 ml. of the equilibrium mixture prepared as set forth in A, the concentration being 1.0 pound per 100 gallons. The top edge of the foil is sealed against the bark by tying with a strip of vulcanized rubber.

Protection for about one year against chestnut blight is provided by the hereinbefore described method.

EXAMPLE II

A. Preparation of the equilibrium mixture

An equivalent quantity of dilithium ethylene bisdithiocarbamate was substituted for the disodium salt of Example I (A). A solution with comparable systemic fungicidal activity was obtained. Dipotassium ethylene bisdithiocarbamate also gave a suitable product.

B. Application to trees

Application was by the same method as in Example I (B). α-Cellulose (from wood pulp) was used instead of cotton wadding and a plasticized poly(vinyl chloride) film was used to replace the polyethylene film. Results were comparable.

EXAMPLE III

A. Preparation of the equilibrium mixture 13.6 parts of tetraethylenepentamine, 16 parts carbon disulfide, 7.4 parts of calcium hydroxide, and 21.9 parts of diethylamine hydrochloride were added to 300 parts water at room temperature. Stirring was continued until the solution was homogeneous. Before use, this solution is diluted to a concentration comparable to 1.5 pounds per 100 gallons.

B. *Application to trees*

Application to 3 to 5-year old chestnut trees was as in Example I (B). Protection for about one year was provided.

I claim:

1. A systemic fungicidal solution which comprises the equilibrium reaction product obtained by reacting in aqueous solution (a) one mole of at least one ethylenepolyamine selected from the group consisting of ethylenediamine, diethylenetriamine, triethylenetetramine, tetraethylenepentamine, and the polyethylenepolyamine mixture formed by the interaction of ethylene dichloride and ammonia, (b) two moles carbon disulfide, (c) two equivalents of a hydroxide selected from the group consisting of lithium, sodium, potassium, ammonium, calcium, and magnesium, and (d) two moles of $R_2NH \cdot HX$ in which R is selected from the group consisting of methyl and ethyl, and X is an equivalent of an anion selected from the group consisting of chloride, bromide, sulfate, phosphate and nitrate.

2. A method of applying the systemic fungicidal solutions as set forth in claim 1 to trees which comprises placing a band of fibrous wadding which is an absorbent for said solutions around the trunk of the tree, placing a band of water impervious film substantially wider than said fibrous wadding on top of said fibrous wadding, joining vertical edges of said band of water impervious film, sealing bottom edge of said water impervious film against trunk of said tree by inserting resilient water-repellent sealing means between bottom edge of said water impervious film and trunk of said tree, applying clamping means to bottom edge of said film and pouring said systemic fungicidal solution into annular ring so formed.

3. A method of applying the systemic fungicidal solutions as set forth in claim 1 to trees which comprises placing a band of fibrous wadding which is an absorbent for said solutions around the trunk of the tree, placing a band of water impervious film substantially wider than said fibrous wadding on top of said fibrous wadding, joining vertical edges of said band of water impervious film, sealing bottom edge of said water impervious film against trunk of said tree by inserting resilient water-repellent sealing means between bottom edge of said water impervious film and trunk of said tree, applying clamping means to bottom edge of said film, pouring said systemic fungicidal solution into annular ring so formed, and sealing upper edge of said film to trunk of said tree by using same means as used for sealing bottom edge of said water impervious film.

4. A method of applying the systemic fungicidal solutions as set forth in claim 1 to trees which comprises placing a band of fibrous absorbent cellulosic wadding around the trunk of the tree, placing a band of polyethylene film substantially wider than said fibrous wadding on top of said fibrous wadding, joining the vertical edges of said polyethylene film, sealing the bottom of said polyethylene film against trunk of said tree by inserting a resilient water-repellent wadding between bottom edge of said polyethylene film and trunk of said tree, applying clamping means to bottom edge of said polyethylene film, pouring said systemic fungicidal solution into annular ring so formed, and sealing upper edge of said polyethylene film to trunk of said tree by using the same means as used for sealing bottom edge of said polyethylene film.

5. A systemic fungicidal solution which comprises the equilibrium reaction product obtained by reacting in aqueous solution (a) one mole of the disodium salt of ethylene bisdithiocarbamic acid and (b) two moles of dimethylammonium sulfate.

6. A process for the control of European chestnut blight (*Endothia parasitica* (Murr.) And.) which comprises applying to the trunks of European chestnut trees in an amount sufficient to control the blight the systemic fungicidal solution as set forth in claim 5.

References Cited in the file of this patent

UNITED STATES PATENTS

| Re. 22,750 | Tisdale | Apr. 30, 1946 |
|---|---|---|
| 116,001 | Gilbert | June 13, 1871 |
| 2,253,541 | Torbett | Aug. 26, 1941 |
| 2,389,870 | Reevely | Nov. 27, 1945 |
| 2,844,623 | Fike | July 22, 1958 |
| 2,845,453 | Brooks | July 29, 1958 |

OTHER REFERENCES

Chemical Abstracts, vol. 44, published 950, column 2159, Article, "Inhibition of Endothia Parasitica."